(12) United States Patent
De Bruijn et al.

(10) Patent No.: US 10,807,294 B2
(45) Date of Patent: Oct. 20, 2020

(54) EXTRUDER SYSTEM FOR EXTRUDING CORD REINFORCED EXTRUDATE

(71) Applicant: VMI HOLLAND B.V., Epe (NL)

(72) Inventors: Ronald Gerardus Maria De Bruijn, Epe (NL); Emiel Hendricus De Jong, Epe (NL); Pieter Cornelis Meijers, Epe (NL)

(73) Assignee: VMI HOLLAND B.V. (NL)

( * ) Notice: Subject to any disclaimer, the term of this patent is extended or adjusted under 35 U.S.C. 154(b) by 383 days.

(21) Appl. No.: 15/566,149

(22) PCT Filed: Apr. 5, 2016

(86) PCT No.: PCT/NL2016/050235
§ 371 (c)(1),
(2) Date: Oct. 12, 2017

(87) PCT Pub. No.: WO2016/167646
PCT Pub. Date: Oct. 20, 2016

(65) Prior Publication Data
US 2018/0093406 A1 Apr. 5, 2018

(30) Foreign Application Priority Data
Apr. 14, 2015 (NL) ..................................... 2014634

(51) Int. Cl.
*B29C 48/56* (2019.01)
*B29C 48/49* (2019.01)
(Continued)

(52) U.S. Cl.
CPC .............. *B29C 48/49* (2019.02); *B29C 48/07* (2019.02); *B29C 48/154* (2019.02);
(Continued)

(58) Field of Classification Search
CPC ..... B29C 48/49; B29C 48/154; B29C 48/156; B29C 48/2883; B29C 48/07; B29C 48/30;
(Continued)

(56) References Cited

U.S. PATENT DOCUMENTS 4,359,354 A 11/1982 Böhm ........................... 156/115
2010/0283173 A1* 11/2010 Kenny .................. B29C 48/156
264/101

FOREIGN PATENT DOCUMENTS

EP 0492425 7/1992 ............. B29C 47/68
EP 1145835 10/2001 ............. B29D 30/38
(Continued)

OTHER PUBLICATIONS

JPH08103972A, Oki, Masahiko, Apr. 23, 1996, machine translation (Year: 1996).*

(Continued)

*Primary Examiner* — Joseph S Del Sole
*Assistant Examiner* — Lawrence D. Hohenbrink, Jr.
(74) *Attorney, Agent, or Firm* — Hayes Soloway P.C.

(57) ABSTRACT

The invention relates to an extruder system and a method for extruding cord reinforced extrudate, wherein the extruder system comprises an extruder head with a die for receiving extrusion material and a cord guide for guiding cords in a common cord plane in a cord direction into the die, wherein the extruder system comprises a first extruder and a second extruder, wherein the extruder head comprises a first flow channel and a second flow channel, wherein the extruder system further comprises a first pump and a second pump for receiving the extrusion material from the first extruder and the second extruder and for directing said extrusion material into the first flow channel and the second flow channel.

27 Claims, 6 Drawing Sheets

(51) Int. Cl.
| | |
|---|---|
| *B29C 48/07* | (2019.01) |
| *B29C 48/21* | (2019.01) |
| *B29C 48/30* | (2019.01) |
| *B29C 48/34* | (2019.01) |
| *B29C 48/37* | (2019.01) |
| *B29C 48/154* | (2019.01) |
| *B29C 48/156* | (2019.01) |
| *B29C 48/285* | (2019.01) |
| *B29D 30/38* | (2006.01) |
| *B33Y 30/00* | (2015.01) |
| *B29C 64/106* | (2017.01) |
| *B29L 30/00* | (2006.01) |
| *B29K 21/00* | (2006.01) |

(52) U.S. Cl.
CPC ............ *B29C 48/156* (2019.02); *B29C 48/21* (2019.02); *B29C 48/2883* (2019.02); *B29C 48/30* (2019.02); *B29C 48/34* (2019.02); *B29C 48/37* (2019.02); *B29C 64/106* (2017.08); *B29D 30/38* (2013.01); *B33Y 30/00* (2014.12); *B29D 2030/381* (2013.01); *B29K 2021/00* (2013.01); *B29L 2030/002* (2013.01)

(58) Field of Classification Search
CPC ......... B29C 48/21; B29C 48/34; B29C 48/37; B29C 64/106; B33Y 30/00; B29D 30/38; B29D 2030/381; B29K 2021/00; B29L 2030/002
USPC ......................................................... 264/165
See application file for complete search history.

(56) References Cited

FOREIGN PATENT DOCUMENTS

| | | | | |
|---|---|---|---|---|
| GB | 2061180 | | 10/1979 | ............... B29C 5/10 |
| JP | H08103972 | | 4/1996 | ............ B29C 47/02 |
| JP | H08103972 A | * | 4/1996 | |
| JP | 2006123300 | | 5/2006 | ............ B29C 47/02 |
| WO | WO2009033270 | | 3/2009 | ............ B29C 47/02 |

OTHER PUBLICATIONS

International Preliminary Report on Patentability issued in application No. PCT/NL2016/050235, dated Mar. 15, 2017 (19 pgs).
International Search Report and Written Opinion issued in application No. PCT/NL2016/050235, dated Sep. 21, 2016 (12 pgs).

* cited by examiner

US 10,807,294 B2

EXTRUDER SYSTEM FOR EXTRUDING CORD REINFORCED EXTRUDATE

BACKGROUND

The invention relates to an extruder system and a method for extruding cord reinforced extrudate, in particular cord reinforced tire components.

Known extruder systems for extruding cord reinforced tire components comprise so-called 'cross head' type extruder heads in which the extrusion material is supplied laterally with respect to the direction in which the cords are fed into the extruder head. EP 1 145 835 A2 discloses such an exemplary extruder system. The known extruder heads are provided with flow channels that deflect the flow of extrusion material from the lateral supply direction towards the cord direction. The flow channels, although optimized for uniform distribution of the extrusion material, are known to cause non-uniformity in the extrudate that leaves the extruder head. In particular, due to asymmetries in the flow channels, the parts of the flow channels that are most distal in the supply direction, will typically receive considerably less extrusion material, resulting in uneven flow rates, non-uniform thickness and/or density across the width of the extrudate.

It is an object of the present invention to provide an extruder system and a method for extruding cord reinforced extrudate, wherein uniformity of the extrudate can be improved.

SUMMARY OF THE INVENTION

According to a first aspect, the invention provides an extruder system for extruding cord reinforced extrudate, in particular cord reinforced tire components, wherein the extruder system comprises an extruder head with a die for receiving extrusion material and a cord guide for guiding cords side by side in a common cord plane in a cord direction into the die so that, in use, the cords are embedded in the extrusion material in the die, wherein the extruder system comprises a first extruder and a second extruder external to the extruder head, wherein the extruder head comprises a first flow channel that debouches into the die from a first side of the cord plane and a second flow channel that debouches into the die from a second side of the cord plane opposite to the first side, wherein the extruder system further comprises a first pump between the first extruder and the first flow channel and a second pump between the second extruder and the second flow channel, wherein the first pump and the second pump are arranged for receiving the extrusion material from the first extruder and the second extruder and for directing said extrusion material into the first flow channel and the second flow channel, respectively.

The first pump and the second pump can uniformly distribute the extrusion material into the flow channels, regardless of the orientation of the extruders and/or irrespective of the direction in which the extrusion material is supplied to the pumps by the respective extruders. The extrusion material can thus be distributed uniformly through the flow channels towards the die, thereby improving the uniformity of the extrudate that ultimately leaves the die.

The 'cross head' type extruder of EP 1 145 835 A2 does not disclose the aforementioned pumps. EP 0 492 425 A1 discloses a compact precision extrudate extrusion system that is able to provide accurate extrudate gauges during changes of stock viscosity of rubber feed strips by use of a gear pump and a control system which continuously measures the various temperatures and pressures at the different positions of the system, which measurements are fed to a computer control which induces changes in the pump and feed speed. In EP 1 145 835 A2, the extruders are positioned laterally with respect to the feeding plane. The pumps according to the invention are used merely to uniformly distribute the flow of extrusion material into the flow channels, irrespective of the direction in which the extrusion material is supplied to the pumps by the respective extruders. In EP 0 492 425 A1, the arrangement of the extruder, the gear pump, the extruder head and the extruded strip is completely coaxial. Therefore, there is no teaching nor a suggestion in EP 0 492 425 A1 that the known gear pump arrangement can be used in EP 1 145 835 A2 for the claimed purpose.

In one embodiment the extruder head has a feeding plane that extends orthogonal to the cord plane and parallel to the cord direction, wherein the first extruder and the second extruder are arranged for supplying the extrusion material in a first supply direction and a second supply direction, respectively, wherein the first supply direction and the second supply direction are oblique with respect to the feeding plane, wherein the first pump and the second pump are arranged for receiving the extrusion material from the first extruder and the second extruder in the first supply direction and the second supply direction, respectively, and for directing said extrusion material in or parallel to the feeding plane into the first flow channel and the second flow channel, respectively. The oblique positioned extruders can at least partly be spaced apart from or placed out of line with respect to the cord direction, thereby preventing that the extruders interfere with or hinder the feeding of the cords from a creelroom to the extruder head.

In a preferred embodiment thereof, the first supply direction and the second supply direction are each offset with respect to the feeding plane over an angle of at least fifteen degrees, preferably at least twenty degrees and most preferably at least thirty degrees. Such angles provide sufficient spacing of the extruders with respect to the cords to allow the cords to be easily fed in the cord direction into the extruder head.

In a practical embodiment thereof the first supply direction and a second supply direction are offset with respect to the cord direction in the same direction. As such, the extruder system can be designed to be more compact and/or more practical, in particular as both extruders can be fed from the same side of the feeding plane.

In an alternative embodiment the extruder head has a feeding plane that extends orthogonal to the cord plane and parallel to the cord direction, wherein the first extruder and the second extruder are arranged for supplying the extrusion material in a first supply direction and a second supply direction, respectively, wherein the first supply direction and the second supply direction extend parallel to or in the feeding plane, wherein the first pump and the second pump are arranged for receiving the extrusion material from the first extruder and the second extruder in the first supply direction and the second supply direction, respectively, and for directing said extrusion material in or parallel to the feeding plane into the first flow channel and the second flow channel, respectively. The supply directions parallel to or in the feeding plane can eliminate the drawback of the uneven distribution of 'cross-head' configurations. To allow access to the cord guide, the cord guide may be arranged on a carriage that is displaceable along a rail in or parallel to the cord plane, away from the die.

Optionally, the first supply direction and the second supply direction extend obliquely with respect to the cord plane. The oblique angle can provide access to the part of the cord plane that extends between the extruders. Regardless of the angle of the supply directions with respect to the cord plane, the gear pumps can generate a uniform pressure in the extrudate that goes into the flow channel.

In an embodiment the first pump and the second pump are arranged for directing the extrusion material symmetrically and/or uniformly distributed with respect to the feeding plane into the first flow channel and the second flow channel, respectively. The pumps can thus improve the distribution of the extrusion material going into the extruder head.

In an embodiment the first flow channel and the second flow channel are arranged for receiving the extrusion material from the first pump and the second pump in, parallel or symmetrical to the feeding plane. The flow channels can thus be adapted to optimally receive the extrusion material from the pumps, to facilitate the in-line, parallel or symmetrical supply of extrusion material.

In an embodiment the feeding plane extends in-line with the cord direction. The extrusion material can thus be fed in-line with the cord direction into the extruder head, contrary to the lateral direction in which the extrusion material is fed into the known extruder heads according to the prior art.

In an embodiment the first flow channel and the second flow channel are symmetrical or substantially symmetrical to the feeding plane. Preferably the first flow channel and the second flow channel are symmetrical or substantially symmetrical to the feeding plane within the entire extruder head. The symmetry of the flow channels within the extruder head can improve the symmetry and/or uniformity of the flow of extrusion material in the extruder head.

In an embodiment the extruder head has a plurality of externally facing surfaces, wherein the first flow channel and the second flow channel are arranged in fluid communication with the material source via an externally facing surface of the extruder head that intersects with the feeding plane. The externally facing surfaces that intersect with the feeding plane, not being the laterally facing side surfaces of the extruder head, can be used to symmetrically connect the flow channels to the material source in accordance with the invention.

In an embodiment the die is provided with a die opening for shaping the extrusion material, wherein the die opening has a width parallel to the cord plane, wherein the feeding plane is at or near the center of the width of the die opening. The extrusion material can thus be fed into the extruder head in a centered position with respect to the width of the die opening, thereby further improving the uniformity of the extrudate when it leaves the die.

In an embodiment the first extruder is arranged for supplying a first compound of the extrusion material into the die via the first flow channel and wherein the second extruder is arranged for supplying a second compound of the extrusion material into the die via the second flow channel. By using two extruders, the two compounds of the extrusion material can be supplied to the two flow channels individually or in separate flows.

In an embodiment the first extruder is arranged for receiving a first compound that is chemically different from the second compound that is received in the second extruder. Thus, it becomes possible to obtain an extrudate with different material characteristics for the part of the extrudate above the cords and the part of the extrudate below the cords.

In an embodiment the first extruder and the second extruder are provided with a first heater for heating the first compound and a second heater for heating the second compound, respectively, wherein the first heater and the second heater are individually controllable. Preferably, the extruder system comprises a first control unit that is operationally connected to the first heater and the second heater, wherein the first control unit is arranged for controlling the first heater to a different temperature than the second heater. The difference in temperature can influence the viscosities and thus the flow rates of the respective compounds in the extruder head. The difference in temperature can be used to control swelling of the extrudate after it leaves the die, for example for controlling the relative position of the cords with respect to the extrudate.

In an embodiment the extruder system is provided with a first pressure sensor and a second pressure sensor at or near the output side of the first pump and the second pump, respectively, and upstream of or at the entrance of the first flow channel and the second flow channel, respectively, for measuring the pressures of the flows of extrusion material flowing from the pumps into the flow channels, wherein the extruder system further comprises a second control unit that is operationally connected to the pumps and the pressure sensors for controlling the speeds of the pumps based on the measurements from the pressure sensors. The pressure in the extrusion material can thus be controlled for each outflow from the respective pumps, to further improve the uniformity of the extrusion material in the extruder head. In particular, the pressures can be set to the same level when the compounds are identical, or to different pressures, based on given data about the ratios between the pressure and the flow rates for different compounds. Thus, one can control the speeds of the pumps to control the pressures and/or flow rates of the extrusion material in the extruder head.

In an embodiment the first pump and the second pump are a first gear pump and a second gear pump, respectively. Gear pumps can provide a flow of extrusion material with constant flow rate and/or pressure.

In a practical embodiment the cord plane is horizontal or substantially horizontal, wherein the first flow channel debouches into the die from below the cord plane and wherein the second flow channel debouches into the die from above the cord plane.

In an embodiment the plurality of externally facing surfaces comprises at least one surface of the group comprising a rear surface facing upstream in the cord direction, a top surface facing upwards away from the cord plane and a bottom surface facing downwards away from the cord plane, wherein the first flow channel and the second flow channel are arranged in fluid communication with the material source via a the rear surface, the top surface and or the bottom surface. These externally facing surfaces, not being the laterally facing side surfaces of the extruder head, can be used to symmetrically connect the flow channels to the material source in accordance with the invention.

According to a second aspect, the invention provides a method for extruding cord reinforced extrudate, in particular cord reinforced tire components, with the use of an extruder system, wherein the extruder system comprises an extruder head and a first extruder and a second extruder external to the extruder head, wherein the extruder head comprises a die for receiving extrusion material, a cord guide for guiding cords side by side in a common cord plane in a cord direction into the die, a first flow channel that debouches into the die from a first side of the cord plane and a second flow channel debouches into the die from a second side of the cord plane opposite to the first side, wherein the method comprises the steps of guiding cords side by side in the common cord plane in the cord direction into the extruder head, supplying extrusion material from the first extruder and the second extruder to the extruder head, wherein the method further comprises the step of providing a first pump between the first extruder and the first flow channel and a second pump between the second extruder and the second flow channel, wherein the first pump and the second pump receive the extrusion material from the first extruder and the second extruder and direct said extrusion material into the first flow channel and the second flow channel, respectively.

The first pump and the second pump can thus uniformly distribute the extrusion material into the flow channels, regardless of the orientation of the extruders and/or irrespective of the direction in which the extrusion material is supplied to the pumps by the respective extruders. The extrusion material can thus be distributed uniformly through the flow channels towards the die, thereby improving the uniformity of the extrudate that ultimately leaves the die.

In an embodiment of the method, the extruder head has a feeding plane that extends orthogonal to the cord plane and parallel to the cord direction, wherein the extrusion material is supplied from the first extruder and the second extruder to the extruder head in a first supply direction and a second supply direction which are oblique to the feeding plane, wherein the first pump and the second pump receive the extrusion material from the first extruder and the second extruder in the first supply direction and the second supply direction, respectively, and direct said extrusion material in or parallel to the feeding plane into the first flow channel and the second flow channel, respectively. The first pump and the second pump can thus uniformly distribute the extrusion material into the flow channels in or parallel to the feeding plane, regardless of the oblique orientation of the extruders with respect to said feeding plane and/or irrespective of the direction in which the extrusion material is supplied to the pumps by the respective extruders.

In an alternative embodiment of the method, the extruder head has a feeding plane that extends orthogonal to the cord plane and parallel to the cord direction, wherein the extrusion material is supplied from the first extruder and the second extruder to the extruder head in a first supply direction and a second supply direction which extend parallel to or in the feeding plane, wherein the first pump and the second pump receive the extrusion material from the first extruder and the second extruder in the first supply direction and the second supply direction, respectively, and direct said extrusion material in or parallel to the feeding plane into the first flow channel and the second flow channel, respectively. The supply directions parallel to or in the feeding plane can eliminate the drawback of the uneven distribution of 'crosshead' configurations. To allow access to the cord guide, the cord guide may be arranged on a carriage that is displaceable along a rail in or parallel to the cord plane, away from the die.

Optionally, the first supply direction and the second supply direction extend obliquely with respect to the cord plane. The oblique angle can provide access to the part of the cord plane that extends between the extruders. Regardless of the angle of the supply directions with respect to the cord plane, the gear pumps can generate a uniform pressure in the extrudate that goes into the flow channel.

In an embodiment the extrusion material is made to flow symmetrical or substantially symmetrical to the feeding plane within the extruder head. Preferably, the entire flow of extrusion material within the extruder head is symmetrical or substantially symmetrical to the feeding plane. The symmetry of the flow channels within the extruder head can improve the symmetry and/or uniformity of the flow of extrusion material in the extruder head.

In an embodiment the first extruder supplies a first compound of the extrusion material and wherein the second extruder supplies a second compound of the extrusion material. By using two extruders, the two compounds of the extrusion material can be supplied to the two flow channels individually or in separate flows.

In an embodiment the first compound is chemically different from the second compound. Thus, it becomes possible to obtain an extrudate with different material characteristics for the part of the extrudate above the cords and the part of the extrudate below the cords.

In an embodiment the first compound is heated to a different temperature than the second compound. The difference in temperature can influence the viscosities and thus the flow rates of the respective compounds in the extruder head. The difference in temperature can be used to control swelling of the extrudate after it leaves the die, for example for controlling the relative position of the cords with respect to the extrudate.

In an embodiment the method further comprises the steps of measuring the pressure of the first compound at or near the output side of the first pump and upstream of or at the entrance to the first flow channel, measuring the pressure of the second compound at or near the output side of the second pump and upstream of or at the entrance to the second flow channel, controlling the speeds of the pumps based on the measurements of the pressures of the compounds. The pressure in the extrusion material can thus be controlled for each outflow from the respective pumps, to further improve the uniformity of the extrusion material in the extruder head.

In an embodiment the compounds are identical or substantially identical, wherein the speeds of the pumps are controlled to supply the compounds into the flow channels at substantially the same pressure. The pressures can be set to the same level when the compounds are identical, so that the flow of the compounds through the die has the same flow rate for each compound, thereby improving the uniformity of the extrudate.

In an embodiment the compounds are different, wherein the speeds of the pumps are controlled based on data about the ratios between the pressure and the flow rate for each of the different compounds, such that the different compounds at different pressures flow at the same or substantially the same flow rate out through and/or out of the die. Thus, one can correct for the different viscosities of the compounds to ultimately arrive at the same flow rate for each of the compounds in the die.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
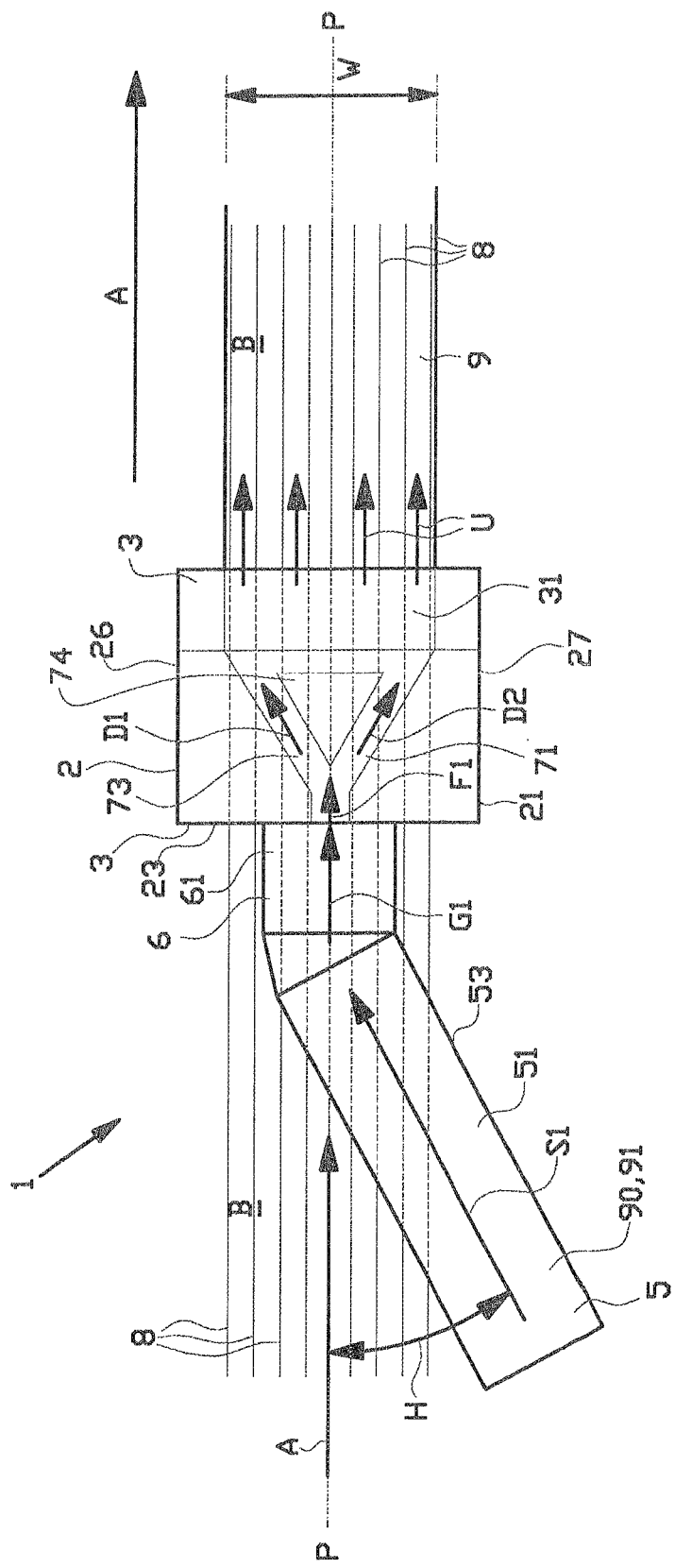
FIG. 1 shows a top view of an extruder system according to a first embodiment of the invention.
Figure 2:
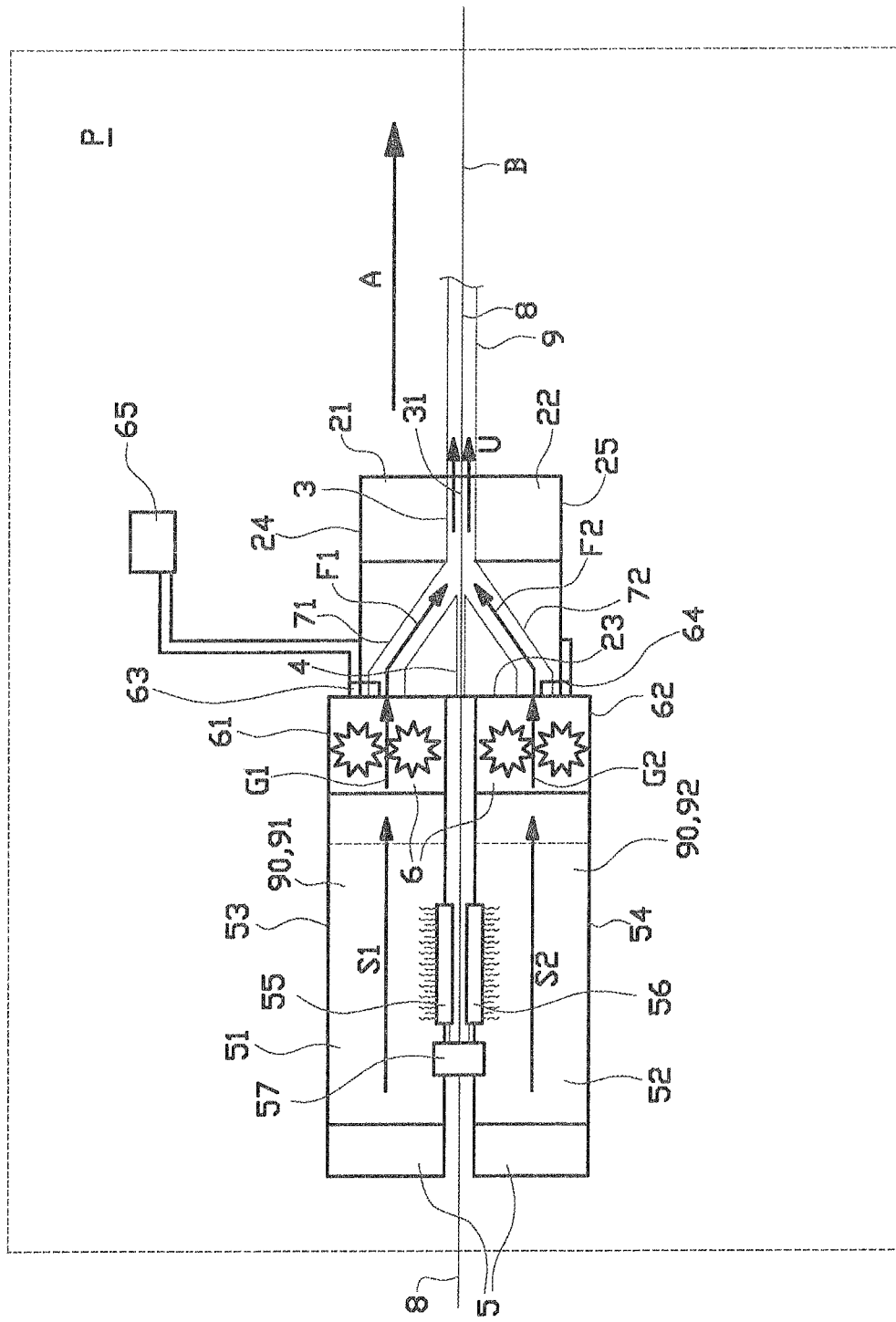
FIG. 2 shows a side view of the extruder system according to FIG. 1.

FIGS. 1 and 2 show an extruder system 1 according to a first embodiment of the invention. The extruder system 1 is arranged for extruding an extrudate 9, in particular a tire component, that has been reinforced with cords 8, typically steel or textile cords. Examples of cord reinforced tire components are breaker plies, body plies, cap strips and chafers.

The extruder system 1 comprises an extruder head 2 with a die 3 for extruding the extrudate 9 and a cord guide 4 for guiding the cords 8 into the die 3 so that the cords 8 in use are embedded into the extrudate 9. The extruder system 1 further comprises a material supply or material source 5 for supplying liquefied extrusion material 90, e.g. a viscous rubber compound 91, 92, to the extruder head 2. The material source 5 is located external to or outside of the extruder head 2. In this exemplary embodiment, the extruder system 1 is further provided with a pump section 6 between the extruder head 2 and the material source 5 for evenly or uniformly distributing the extrusion material 90 from the material source 5 into the extruder head 2.

As shown in FIG. 2, the extruder head 2 is provided with a first half 21 and a second half 22 which are mated together to form the die 3 and the cord guide 4. The cord guide 4 is provided with a plurality of guide channels (not shown and known per se) for receiving the cords 8 in a cord direction A from a creelroom (not shown and known per se) and for guiding the cords 8 in a side by side orientation in a common cord plane B into the die 3. In this exemplary embodiment, the cord plane B extends horizontally or substantially horizontally. As best seen in FIG. 1, the cords 8 are extending mutually parallel into, through and out of the extruder head 2 in the cord direction A.

As shown in FIGS. 1 and 2, the die 3 is provided with a die opening 31 through which the extrusion material 90 is forced into the shape of the extrudate 9. The die opening 31 has a width W parallel to the cord plane B that substantially corresponds to the desired width W of the extrudate 9. In this exemplary embodiment, the die 3 is a separate piece of tooling that is mounted directly downstream of the cord guide 4 and that can be interchanged by other tooling when extrudates with different cross sections are to be produced.

As shown in FIGS. 1 and 2, the extruder head 2 has a plurality of externally facing surfaces. In particular, in this exemplary embodiment, the extruder head is shaped like a block, comprising a rear surface 23 facing upstream or opposite to the cord direction A, a top surface 24 facing upwards and away from the cord plane B and a bottom surface 25 facing downwards and away from the cord plane B, and two sides 26, 27 that are facing laterally away from the cord direction A in a direction parallel to the cord plane B. The extruder head 2 is provided with a first flow channel 71 extending in the first half 21 of the extruder head 2 for connecting the material source 5 in fluid communication to the die 3. The first flow channel 71 connects to the externally located material source 5 via one of the externally facing surfaces 23, 24 at the first half 21 of the extruder head 2, not being one of the two laterally facing sides 26, 27. In this example, the first flow channel 71 connects to the externally located material source 5 via the rear surface 23. The first flow channel 71 merges or debouches into the die 3 from a first side of the cord plane B.

As best seen in FIG. 2, the extruder head 2 comprises a second flow channel 72 similar or identical to the first flow channel 71. In this example, the second flow channel 72 is mirror symmetrical to the first flow channel with respect to the cord plane B. The second flow channel 72 extends in the second half 22 of the extruder head 2 for connecting the material source 5 in fluid communication to the die 3. Like the first flow channel 71, the second flow channel 72 connects to the externally located material source 5 via one of the externally facing surfaces 23, 25 at the second half 22 of the extruder head 2, not being one of the two laterally facing sides 26, 27. In this example, the second flow channel 72 also connects to the externally located material source 5 via the rear surface 23, yet on the opposite side with respect to the cord plane B of the connection of the first flow channel 71 to the material source 5. The second flow channel 72 merges or debouches into the die 3 from a second side of the cord plane B, opposite to the first side.

Later in the description, two alternative embodiments of the invention will be described in more detail, in which the first flow channel 71 and the second flow channel 72 connect to the externally located material source 5 via the top surface 24 and the bottom surface 25, respectively.

As shown in FIG. 1, the first flow channel 71 is arranged for receiving the extrusion material 90 from the material source 5 in a first inflow direction F1 extending in an in-line feeding plane P with respect to the cord direction A. The same applies to the second flow channel 72 which, although not shown in FIG. 1, is arranged for receiving the extrusion material 90 from the material source 5 in a second inflow direction F2 (see FIG. 2) extending in the same in-line feeding plane P. The feeding plane P extends perpendicular or orthogonal to the cord plane B and in-line or parallel to the cord direction A. In the case where the cord plane B extends horizontal or substantially horizontal, the feeding plane P extends vertical or substantially vertical. In this example, the feeding plane P is arranged at the center of the width W of the die opening 31. The feeding plane P intersects with the rear surface 23, the top surface 24 and the bottom surface 25 of the extruder head 2.

The first flow channel 71 and the second flow channel 72 are shaped to be symmetrical or substantially symmetrical to the feeding plane P, preferably within the entire extruder head 2. Thus, after receiving the extrusion material 90 in the respective inflow directions F1, F2, the flow channels 71, 72 are arranged for guiding the flow of the extrusion material 90 within the extruder head 2 in a symmetrical or substantially symmetrical fashion with respect to the feeding plane P.

In particular, as shown in FIG. 1, the first flow channel 71 is provided with a diverging section 73 that symmetrically diverges with respect to the feeding plane P in the cord direction A to evenly or uniformly distribute the extrusion material 90 towards the die opening 31 across the entire width W of the die opening 31. The same symmetrical divergence is applied to the second flow channel 72. To further improve the evenness or uniformity of the distribution in the flow channels 71, 72, the flow channels 71, 72 may be provided with a distribution insert 74 in the diverging section 73. The distribution insert 74 in a manner known per se forces or splits the inflow of extrusion material 90 into two separately diverging flows D1, D2 towards the die opening 31. Different inserts 74 may be provided for each of the flow channels 71, 72. The resulting outflow U of extrusion material 90 is substantially uniform or even in viscosity, flow rate and/or density across the width W of the die opening 31.

As shown in FIG. 2, the material source 5 comprises a first extruder 51 that is operationally connected to or arranged in fluid communication with the first flow channel 71 and a second extruder 52 that is operationally connected to or arranged in fluid communication with the second flow channel 72. The first extruder 51 comprises a barrel 53 that is arranged for receiving a first compound 91 of the extrusion material 90 and for supplying said first compound 91 to the first flow channel 71 in a first supply direction S1, parallel to the direction of the barrel 53 of the first extruder 51. The second extruder 52 also comprises a barrel 54 that is arranged for receiving a second compound 92 of the extrusion material 90 and for supplying said second compound 92 to the second flow channel 72 in a second supply direction S2, parallel to the direction of the barrel 54 of the second extruder 52. In this exemplary embodiment, the first compound 91 is the same as the second compound 92. Alternatively, the first compound 91 may be materially or chemically different from the second compound 92 to arrive at different material characteristics for the part of the extrudate 9 above the cords 8 and the part of the extrudate 9 below the cords 8.

The material source 5 according to the invention further comprises a first heater 55 that is thermally coupled to the first extruder 51 for heating the first compound 91 and a second heater 56 that is thermally coupled to the second extruder 52 for heating the second compound 92. Optionally, the extruder system 1 is provided with a first control unit 57 that is operationally connected to the first heater 55 and the second heater 56 for individually controlling the heaters 55, 56. This feature can be used to control the temperature of the first compound 91 to a different temperature than the temperature of the second compound 92, which influences the viscosities and thus the flow rates of the respective compounds 91, 92 in the extruder head 2. The difference in temperature can be used to control swelling of the extrudate 9 after it leaves the die 3, for example for controlling the relative position of the cords 8 with respect to the extrudate 9.

As shown in the side view of FIG. 2, the first extruder 51 and the second extruder 52 are positioned with their respective supply directions S1, S2 extending parallel or substantially parallel to the cord plane B. In the top view of FIG. 1, it is shown that the first extruder 51 (and the second extruder 52 hidden underneath the first extruder 51), are offset or placed at an oblique angle with respect to the cord direction A and/or the feeding plane P. In particular, the extruders 51, 52 are position such that their respective supply directions S1, S2 are offset with respect to the feeding plane P over an angle H of at least fifteen degrees, preferably at least twenty degrees and most preferably at least thirty degrees, with a maximum of ninety degrees. Thus, the barrels 53, 54 of the extruders 51, 52 are laterally offset with respect to the cord direction A in a direction parallel to the cord plane B and do not interfere with or hinder the feeding of the cords 8 from the creelroom (not shown) to the extruder head 2 in the cord direction A.

In this example, the extruders 51, 52 are offset over the same angle H and in the same direction with respect to the feeding plane P. Alternatively, the extruders 51, 52 may be offset over different angles and/or in opposite directions with respect to the feeding plane P. In all of the aforementioned variants, the compounds 91, 92, in their respective supply directions S1, S2, are supplied asymmetrically with respect to the feeding plane P.

As shown in FIG. 2, the pump section 6 is provided with a first gear pump 61 that is located in fluid communication between the first extruder 51 and the first flow channel 71 and a second gear pump 62 that is located in fluid communication between the second extruder 52 and the second flow channel 72. The first gear pump 61 and the second gear pump 62 are arranged in fluid communication with the downstream ends of the first extruder 51 and the second extruder 52, respectively, for receiving the first compound 91 in the first supply direction S1 and the second compound 92 in the second supply direction S2, respectively. The first gear pump 61 and the second gear pump 62 have a first output direction G1 and a second output direction G2, respectively, which are different from the first supply direction S1 and the second supply direction S2. In particular, the gear pumps 61, 62 are arranged for deflecting or directing the compounds 91, 92 from their respective supply direction S1, S2 to the respective output directions G1, G2, wherein the output directions G1, G2 are in line with, parallel to or symmetrical with respect to feeding plane P. As such, the compounds 91, 92 that are output from the first gear pump 61 and the second gear pump 62 in the respective output directions G1, G2 can be symmetrically received with respect to the feeding plane P into the first flow channel and the second flow channel 72, respectively, symmetrically to the feeding plane P.

The gear pumps 61, 62 are particularly useful for evenly or uniformly metering, dosing, pressurizing and/or distributing the flow of extrusion material 90 in or symmetrical to the feeding plane P into the first flow channel 71 and the second flow channel 72, respectively, to improve the evenness or uniformity of the extrudate 9.

As shown in FIG. 2, the extruder system 1 is provided with a first pressure sensor 63 and a second pressure sensor 64 at or near the output side of the first gear pump 61 and the second gear pump 62, respectively, upstream of or at the entrance of the first flow channel 71 and the second flow channel 72, respectively, for measuring the pressure of the compounds 91, 92 flowing out of the gear pumps 61, 62 in their respective output direction G1, G2. The extruder system 1 further comprises a second control unit 65 that is operationally coupled to the gear pumps 61, 62 and the pressure sensors 63, 64 for controlling the speed of the gear pumps 61, 62 based on the measurement signals from the pressure sensors 63, 64. In particular when identical compounds 91, 92 are used, the gear pumps 61, 62 are controlled via a feedback loop with the pressure sensors 63, 64 and the second control unit 65 to match the pressures of both compounds 91, 92 flowing in the respective output directions G1, G2. When two different compounds 91, 92 are used, test, known or given data about the ratios between the pressure and flow rate for each of the compounds 91, 92 is stored in the second control unit 65 and the gear pumps 61, 62 are controlled via a feedback loop with the pressure sensors 63, 64 and the second control unit 65 to different pressures which, according to the data, should result in equal flow rates of the outflows U of the compounds 91, 92 in the die 3.

Figure 3:
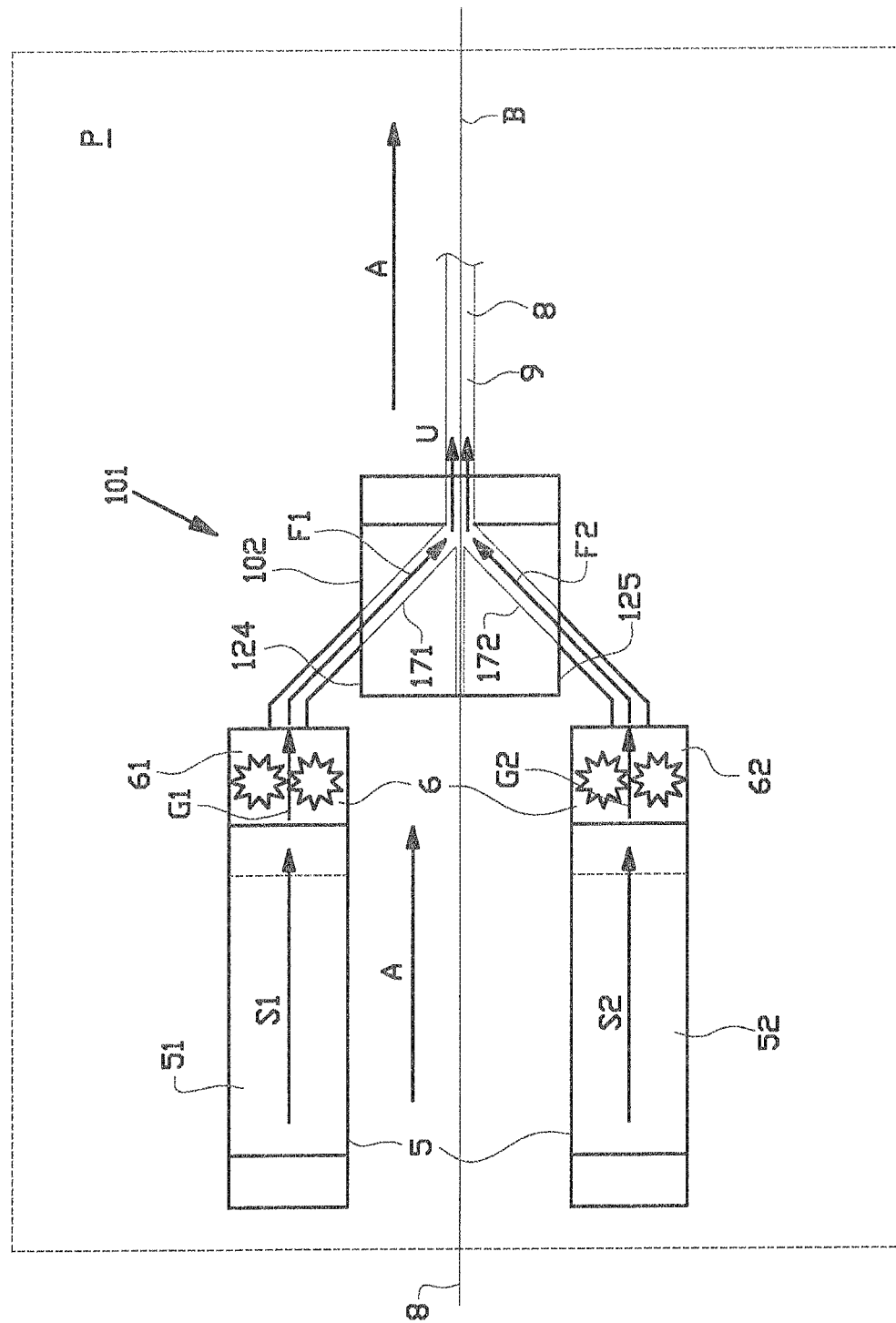
FIG. 3 shows a side view of an alternative extruder system according to a second embodiment of the invention.
Figure 4:
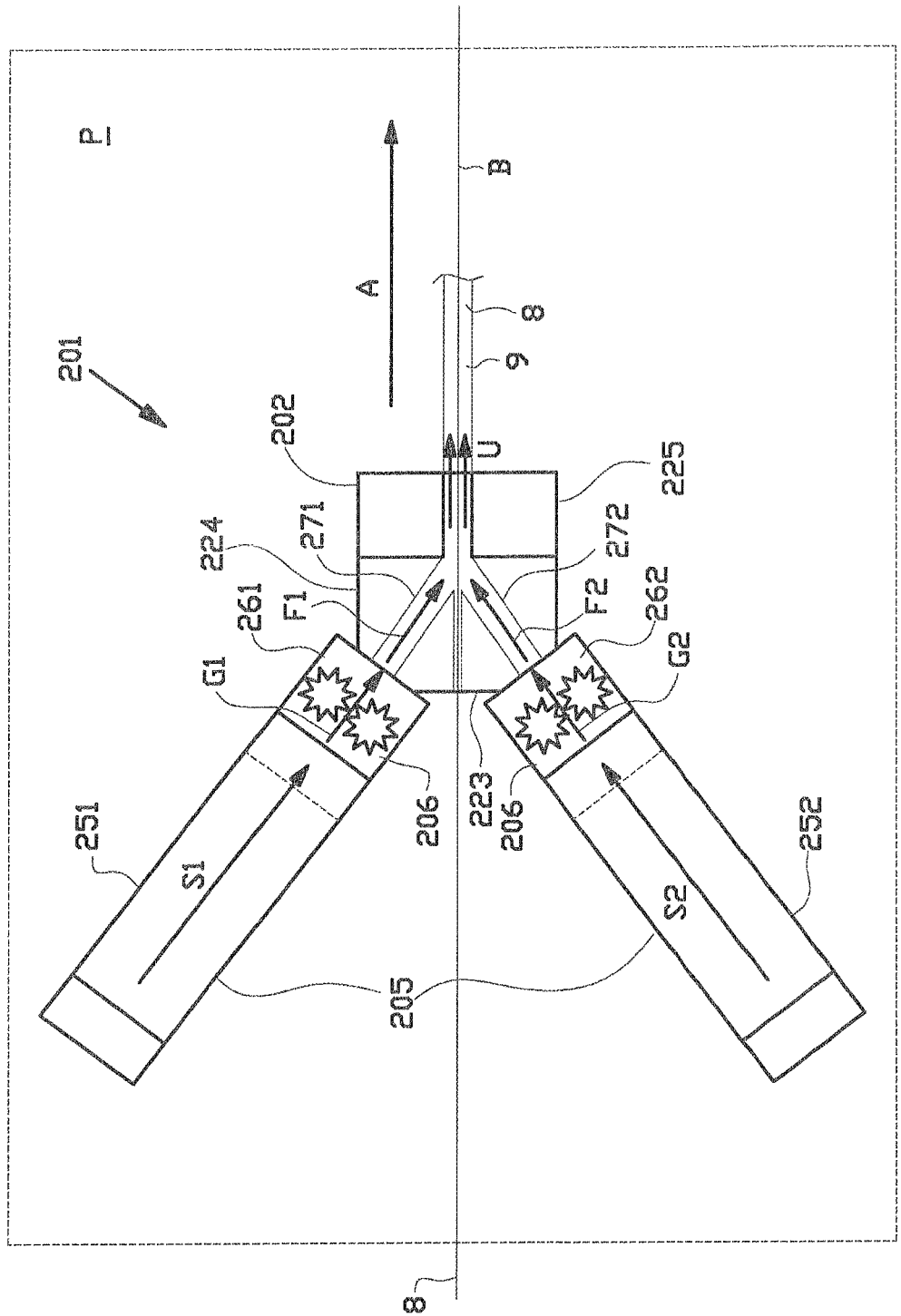
FIG. 4 shows a side view of a further alternative extruder system according to a third embodiment of the invention.

FIGS. 3 and 4 show two alternative embodiments of the invention to illustrate the scope of the invention.

FIG. 3 shows an alternative extruder system 101 according to a second embodiment of the invention, comprising an alternative extruder head 102. The alternative extruder head 102 differs from the extruder head 2 as shown in FIG. 2 in that it is provided with an alternative first flow channel 171 and an alternative second flow channel 172 that connect to the material source 105 via the top surface 124 and the bottom surface 125, respectively.

FIG. 4 shows a further alternative extruder system 201 according to a third embodiment of the invention, comprising a further alternative extruder head 202 and an alternative configuration of the material source 205 and the pump section 206. The alternative extruder head 202 differs from the extruder head 2 as shown in FIG. 2 in that it is provided with an alternative first flow channel 271 and an alternative second flow channel 272 that connect to the material source 205 via a corner of the top surface 224 and the rear surface 223 and via a corner of the bottom surface 225 and the rear surface 223, respectively. The first extruder 251 and the second extruder 252, as well as the first gear pump 261 and the second gear pump 262, respectively, are placed at an inclination with respect to the cord plane B to improve the alignment of the output directions G1, G2 of the respective gear pumps 261, 262 with respect to the inflow directions F1, F2 of the respective flow channels 271, 272.

Figure 5:
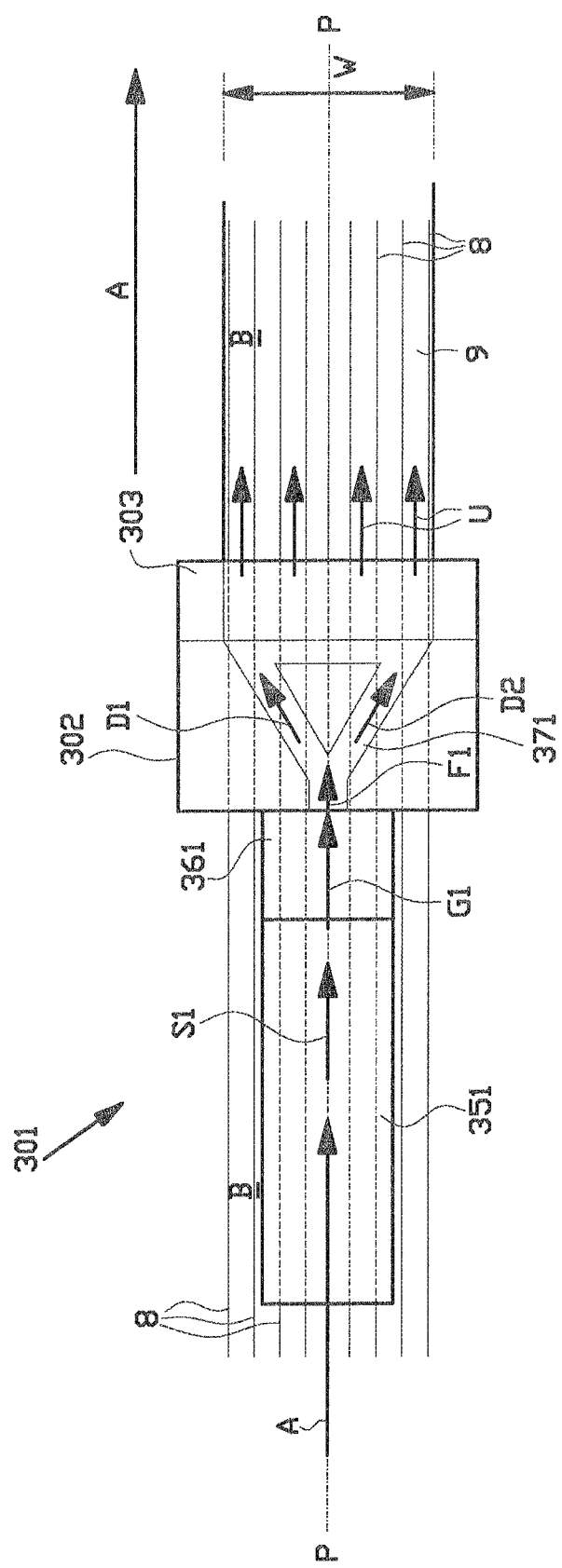
FIGS. 5 and 6 show a top view and a side view, respectively, of a further alternative extruder system according to a fourth embodiment of the invention.
Figure 6:
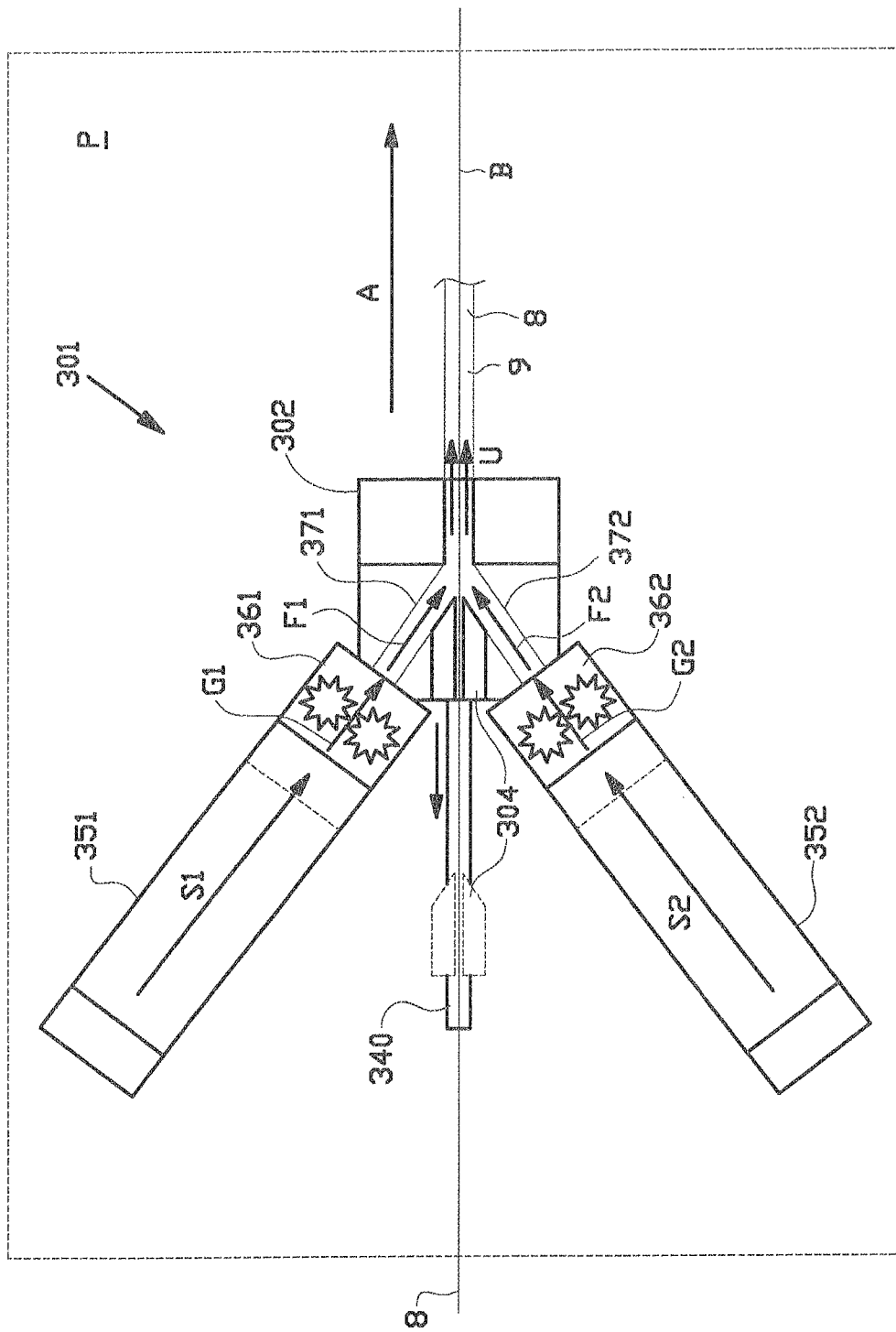

FIGS. 5 and 6 show a further alternative extruder system 301 according to a fourth embodiment of the invention. The extruder system 301 differs from the previously discussed extruders systems 1, 101, 201 in that its extruders 351, 352 are arranged parallel to or in the feeding plane P so that their respective supply directions S1, S2 are also parallel to or in the feeding plane P. Hence, the gear pumps 361, 362 are arranged for receiving and directing the extrudate 9 from the first extruder 351 and the second extruder 352 in the first supply direction S1 and the second supply direction S2, respectively, and for directing said extrusion material 9 in or parallel to the feeding plane P into the first flow channel 371 and the second flow channel 372, respectively, of the extruder head 302. As shown in FIG. 6, the first supply direction S1 and the second supply direction S2 may optionally extend obliquely with respect to the cord plane.

To allow for easy access to the cord guide 304, the cord guide 304 is placed on a carriage that is slidable in or parallel to the cord plane B along a linear guide 340 to a position away from the die 303.

It is to be understood that the above description is included to illustrate the operation of the preferred embodiments and is not meant to limit the scope of the invention. From the above discussion, many further variations will be apparent to one skilled in the art that would yet be encompassed by the scope of the present invention.

In summary the invention relates to an extruder system and a method for extruding cord reinforced extrudate, wherein the extruder system comprises an extruder head with a die for receiving extrusion material and a cord guide for guiding cords in a common cord plane in a cord direction into the die, wherein the extruder system comprises a first extruder and a second extruder, wherein the extruder head comprises a first flow channel and a second flow channel, wherein the extruder system further comprises a first pump and a second pump for receiving the extrusion material from the first extruder and the second extruder and for directing said extrusion material into the first flow channel and the second flow channel.

The invention claimed is:

1. A method for extruding cord reinforced extrudate, with the use of an extruder system, wherein the extruder system comprises an extruder head and a first extruder and a second extruder external to the extruder head, wherein the extruder head comprises a die for receiving extrusion material, a cord guide for guiding cords side by side in a common cord plane in a cord direction into the die, a first flow channel that debauches into the die from a first side of the cord plane and a second flow channel debouches into the die from a second side of the cord plane opposite to the first side, wherein the extruder head has a feeding plane that extends orthogonally to the cord plane and parallel to the cord direction, wherein the method comprises the steps of guiding cords side by side in the common cord plane in the cord direction into the extruder head, supplying extrusion material from the first extruder and the second extruder to the extruder head in a first supply direction and a second supply direction which are oblique to the feeding plane, wherein the method further comprises the step of providing a first pump between the first extruder and the first flow channel and a second pump between the second extruder and the second flow channel, wherein the first pump and the second pump receive the extrusion material from the first extruder and the second extruder in the first supply direction and the second supply direction, respectively, and direct said extrusion material in or parallel to the feeding plane into the first flow channel and the second flow channel, respectively.

2. The method according to claim 1, wherein the extrusion material is made to flow symmetrically to the feeding plane within the extruder head.

3. The method according to claim 1, wherein the entire flow of extrusion material within the extruder head is symmetrical to the feeding plane.

4. The method according to claim 1, wherein the first extruder supplies a first compound of the extrusion material and wherein the second extruder supplies a second compound of the extrusion material.

5. The method according to claim 4, wherein the first compound is chemically different from the second compound.

6. The method according to claim 4, wherein the first compound is heated to a different temperature than the second compound.

7. The method according to claim 4, wherein the method further comprises the steps of measuring the pressure of the first compound at or near an output side of the first pump and upstream of or at the entrance to the first flow channel, measuring the pressure of the second compound at or near an output side of the second pump and upstream of or at the entrance to the second flow channel, controlling the speeds of the pumps based on the measurements of the pressures of the compounds.

8. The method according to claim 7, wherein the compounds are identical, wherein the speeds of the pumps are controlled to supply the compounds into the flow channels at substantially the same pressure.

9. The method according to claim 7, wherein the compounds are different, wherein the speeds of the pumps are controlled based on data about the ratios between the pressure and the flow rate for each of the different compounds, such that the different compounds at different pressures flow at the same flow rate through and/or out of the die.

10. An extruder system for extruding cord reinforced extrudate, wherein the extruder system comprises an extruder head with a die for receiving extrusion material and a cord guide for guiding cords side by side in a common cord plane in a cord direction into the die so that, in use, the cords are embedded in the extrusion material in the die, wherein the extruder system comprises a first extruder and a second extruder external to the extruder head, wherein the extruder head comprises a first flow channel that debouches into the die from a first side of the cord plane and a second flow channel that debouches into the die from a second side of the cord plane opposite to the first side, wherein the extruder head has a feeding plane that extends orthogonally to the cord plane and parallel to the cord direction, wherein the first extruder and the second extruder are arranged for supplying the extrusion material in a first supply direction and a second supply direction, respectively, wherein the first supply direction and the second supply direction are oblique with respect to the feeding plane, wherein the extruder system further comprises a first pump between the first extruder and the first flow channel and a second pump between the second extruder and the second flow channel, wherein the first pump and the second pump are arranged for receiving the extrusion material from the first extruder and the second extruder in the first supply direction and the second supply direction, respectively, and for directing said extrusion material in or parallel to the feeding plane into the first flow channel and the second flow channel, respectively.

11. The extruder system according to claim 10, wherein the first supply direction and the second supply direction are each offset with respect to the feeding plane over an angle of at least fifteen degrees.

12. The extruder system according to claim 10, wherein the first supply direction and the second supply direction are offset with respect to the cord direction in the same direction.

13. The extruder system according to claim 10, wherein the first pump and the second pump are arranged for directing the extrusion material symmetrically and/or uniformly distributed with respect to the feeding plane into the first flow channel and the second flow channel, respectively.

14. The extruder system according to claim 10, wherein the first flow channel and the second flow channel are arranged for receiving the extrusion material from the first pump and the second pump, in parallel or symmetrical to the feeding plane.

15. The extruder system according to claim 10, wherein the feeding plane extends in-line with the cord direction.

16. The extruder system according to claim 10, wherein the first flow channel and the second flow channel are symmetrical to the feeding plane.

17. The extruder system according to claim 10, wherein the first flow channel and the second flow channel are symmetrical to the feeding plane within the entire extruder head.

18. The extruder system according to claim 10, wherein the extruder head has a plurality of externally facing surfaces, wherein the first flow channel and the second flow channel are arranged in fluid communication with the material source via an externally facing surface of the extruder head that intersects with the feeding plane.

19. The extruder system according to claim 10, wherein the die is provided with a die opening for shaping the extrusion material, wherein the die opening has a width parallel to the cord plane, wherein the feeding plane is at or near the center of the width of the die opening.

20. The extruder system according to claim 10, wherein the first extruder is arranged for supplying a first compound of the extrusion material into the die via the first flow channel and wherein the second extruder is arranged for supplying a second compound of the extrusion material into the die via the second flow channel.

21. The extruder system according to claim 20, wherein the first compound is chemically different from the second compound.

22. The extruder system according to claim 20, wherein the first extruder and the second extruder are provided with a first heater for heating the first compound and a second heater for heating the second compound, respectively, wherein the first heater and the second heater are individually controllable.

23. The extruder system according to claim 22, wherein the extruder system comprises a first control unit that is operationally connected to the first heater and the second heater, wherein the first control unit is arranged for controlling the first heater to a different temperature than the second heater.

24. The extruder system according to claim 10, wherein the extruder system is provided with a first pressure sensor and a second pressure sensor at or near an output side of the first pump and the second pump, respectively, and upstream of or at the entrance of the first flow channel and the second flow channel, respectively, for measuring the pressures of the flows of extrusion material flowing from the pumps into the flow channels, wherein the extruder system further comprises a second control unit that is operationally connected to the pumps and the pressure sensors for controlling the speeds of the pumps based on the measurements from the pressure sensors.

25. The extruder system according to claim 10, wherein the first pump and the second pump are a first gear pump and a second gear pump, respectively.

26. The extruder system according to claim 10, wherein the cord plane is horizontal, wherein the first flow channel debouches into the die from below the cord plane and wherein the second flow channel debouches into the die from above the cord plane.

27. The extruder system according to claim 26, wherein the extruder head has a plurality of externally facing surfaces, wherein the first flow channel and the second flow channel are arranged in fluid communication with the material source via an externally facing surface of the extruder head that intersects with the feeding plane, wherein the plurality of externally facing surfaces comprises at least one surface of the group comprising a rear surface facing upstream in the cord direction, a top surface facing upwards away from the cord plane and a bottom surface facing downwards away from the cord plane, wherein the first flow channel and the second flow channel are arranged in fluid communication with the material source via the rear surface, the top surface and/or the bottom surface.

* * * * *